Patented Feb. 11, 1936

2,030,824

UNITED STATES PATENT OFFICE 2,030,824

1-AMINO-2-ANTHRAQUINONYL-ANTHRAQUINONE-AZOLES

Paul Nawiasky, Ludwigshafen-on-the-Rhine, Berthold Stein, Mannheim, and Erich Berthold and Robert Zell, Ludwigshafen-on-the-Rhine, Germany, assignors to General Aniline Works, Inc., New York, N. Y., a corporation of Delaware No Drawing. Application September 18, 1933, Serial No. 690,025. In Germany September 23, 1932

1 Claim. (Cl. 260—44)

The present invention relates to 1-aminoanthraquinone-azoles, in particular aminoanthraquinone-oxazoles, -thiazoles and -imidazoles, and process of producing same.

We have found that the beforementioned 1-aminoanthraquinone-azoles which are valuable vat dyestuffs, are readily obtained in good yields and pure form by causing ammonia to react on the corresponding 1-nitroanthraquinone-azoles whereby the nitro group is replaced by the amino group. The reaction may be carried out by heating the said nitroanthraquinone-azoles with ammonia to temperatures above about 100° C. The ammonia may be employed in the gaseous or liquid state, or in the form of aqueous solutions thereof which should be used in concentrations preferably above about 20 per cent strength. When using gaseous ammonia, the reaction is advantageously carried out in an inert organic diluent of high boiling point, for example nitrobenzene, phenol and naphthalene. We prefer the latter method since it allows of replacing the nitro group by the amino group in the same solvent which is used when preparing the azoles by condensation of a 1-nitroanthraquinone-2-carboxylic acid, or an acid halide thereof, with an aminoanthraquinone substituted in the ortho position to the amino group by a hydroxy, mercapto or amino group. A further advantage of replacing the nitro group by means of ammonia in the manner described resides in the fact that the aminoanthraquinone-azoles produced can directly be subjected to further reactions, for example to acylation or condensation with halogenated organic compounds to form imines, without recovering the aminoanthraquinone-azoles from their reaction mixtures.

When replacing the nitro group by the amino group by means of gaseous or liquid ammonia or concentrated aqueous solutions thereof, the reaction is, of course, to be carried out in an autoclave under increased pressure. Compounds yielding ammonia under the reaction conditions may be employed instead of ammonia, for example urea, urethane, ammonium carbamate and the like.

The following examples will further illustrate how the invention is carried out in practice, but the invention is not restricted thereto. The parts are by weight.

Example 1

10 parts of 1-nitro-2-anthraquinonyl-2',3'-anthraquinone-oxazole obtainable by closing the azole ring in 1-nitroanthraquinone-2-carbonyl-amino-2',3'-hydroxyanthraquinone by means of concentrated sulphuric acid at between about 100° and about 120° C. are heated in 100 parts of nitrobenzene at between about 180° and about 190° C. Gaseous ammonia is then introduced into the reaction mixture until the nearly colourless crystals of the initial material have been converted into the red needles of 1-aminoanthraquinonyl-2',3'-anthraquinone-oxazole. The reaction product is filtered off and freed from nitrobenzene. The product which is obtained in a nearly quantitative yield and a very pure form, dissolves in concentrated sulphuric acid to give an olive-brown solution and dyes cotton from the vat, olive-black shades which on oxidation pass into a bluish-red of very good fastness properties.

1 - nitro - 2 - anthraquinonyl - 2',3' - anthraquinone-thiazole and the corresponding imidazole are converted into the corresponding amino compounds by means of ammonia in an analogous manner.

Example 2

10 parts of 1-nitro-2-anthraquinonyl-2',1'-anthraquinone-oxazole obtainable by closing the azole ring in 1-nitroanthraquinone-2-carbonyl-amino-1',2'-hydroxyanthraquinone in nitrobenzene by means of para-toluene sulphonic acid between about 180° and 190° C., are heated in 100 parts of nitrobenzene with from 10 to 15 parts of urea at between about 180° and 190° C. until only red crystals can be detected. The reaction product is then filtered off and worked up in the usual manner. The 1-amino-2-anthraquinonyl-2',1'-anthraquinone-oxazole obtained in a very pure form and a high yield dissolves in concentrated sulphuric acid to give a reddish yellow solution and dyes cotton, from a bluish red vat, strong yellowish red shades.

The conversion of 1-nitro-2-anthraquinonyl-2',1'-anthraquinone-thiazole and imidazole into the corresponding amino compounds by means of ammonia proceeds in an analogous manner.

Example 3

25 parts of 1-nitro-2-anthraquinonyl-1'(S),2'-anthraquinone-thiazole obtainable by heating 1-nitroanthraquinone-2-carboxylic acid chloride with 1-mercapto-2-aminoanthraquinone in trichlorobenzene at about 190° C., are slowly heated to about 180° C. with 50 parts of urea in 750 parts of nitrobenzene. There by the colourless crystals of the initial material are converted into red needles. The reaction mixture is kept at the said temperature for some time and the reaction product recovered in the usual manner. The 1-amino-2-anthraquinonyl-1'(S),2'-anthraquinone-thiazole probably corresponding to the formula

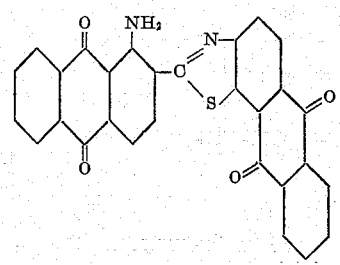

dissolves in concentrated sulphuric acid to give a yellow solution which on the addition of formaldehyde changes to a greenish-blue. Cotton is dyed, from a currant vat, Bordeaux red shades.

Example 4

25 parts of 1-nitro-2-anthraquinonyl-1',2'(S)-anthraquinone-thiazole obtainable by heating at about 180° C. 1-nitroanthraquinone-2-carboxylic acid chloride with 1-amino-2-mercapto-anthraquinone in trichlorbenzene, are heated at about 180° C. with 50 parts of urea in 750 parts of nitrobenzene until the faintly loam crystals of the initial material are completely converted into red needles. The reaction mixture is allowed to cool to between about 100° and about 120° C. and the reaction product recovered in the usual manner. The 1-amino-2-anthraquinonyl-1',2'(S)-anthraquinone-thiazole probably corresponding to the formula

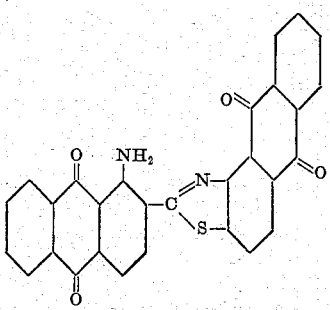

dissolves in concentrated sulphuric acid to give a yellow solution which on the addition of formaldehyde changes to green-blue. It dyes cotton, from a currant vat, Bordeaux red shades.

Example 5

3 parts of 1-nitro-2-anthraquinonyl-2',3'-anthraquinone-imidazole obtainable by heating at about 200° C. 1-nitroanthraquinone-2-carboxylic acid chloride with 2,3-diaminoanthraquinone in nitrobenzene, are suspended in 50 parts of nitrobenzene and heated to between about 190° and about 200° C. whereupon gaseous ammonia is passed into the reaction mixture until initial material can no longer be detected. The 1-amino-2-anthraquinonyl-2',3'-anthraquinone-imidazole probably corresponding to the formula

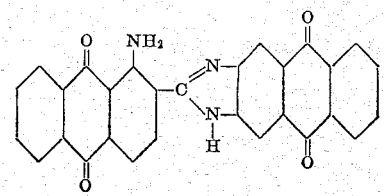

dissolves in concentrated sulphuric acid to give a yellow-red solution which on the addition of formaldehyde changes to green-blue. It dyes cotton, from a blue red vat, Bordeaux-red shades.

A similar dyestuff is obtained by treating 1-nitro-2-anthraquinonyl-1',2'-anthraquinone-imidazole with ammonia or compounds yielding ammonia.

Example 6

40 parts of 1-nitro-2-anthraquinonyl-6'-chloro-2',3'-anthraquinone-oxazole obtainable by closing the azole ring in 1-nitroanthraquinone-2-carbonylamino-2',3'-hydroxy-6'-chloroanthraquinone which may be prepared by condensation of 1-nitroanthraquinone-2-carboxylic acid chloride with 2-amino-3-hydroxy-6-chloroanthraquinone, in nitrobenzene by means of paratoluene sulphonic acid at between about 180° and about 190° C., are suspended in 800 parts of nitrobenzene and heated to between about 180° and about 190° C., whereupon ammonia is led into the reaction mixture until initial material can no longer be detected. The reaction product is filtered off at a temperature between about 100° and about 120° C. and freed from nitrobenzene in the usual manner. The 1-amino-2-anthraquinonyl-6'-chloro-2',3'-anthraquinone-oxazole probably corresponding to the formula

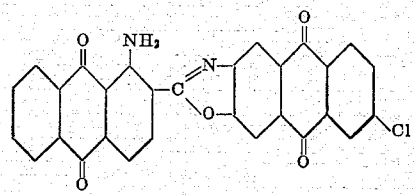

obtained in an excellent yield and in a highly pure state forms red needles dissolving in concentrated sulphuric acid to give a yellow-red solution and dyeing cotton, from a violet vat having an olive tinge, clear yellowish-red shades. The chlorine atom is not eliminated during vatting.

Example 7

10 parts of 1-nitro-2-anthraquinonyl-4'-hydroxy-2',1'-anthraquinone-oxazole obtainable by treating 1-nitroanthraquinone-2-carbonyl-amino-1',2',4'-dihydroxyanthraquinone which may be prepared by condensation of 1-nitroanthraquinone-2-carboxylic acid chloride with 1-amino-2,4-dihydroxyanthraquinone, with sulphuric acid at about 95° C., are suspended in 150 parts of nitrobenzene and heated to between about 180° and 185° C., whereupon ammonia is led into the reaction mixture until unchanged initial material can no longer be detected. The reaction mixture is then worked up in the usual manner. The 1-nitro-2-anthraquinonyl-4'-hydroxy-2',1'-anthraquinone-oxazole thus obtained forms red needles, dissolves in concentrated sulphuric acid to give a red-yellow solution and dyes cotton from a blue red vat, bluish-red shades.

What we claim is:—
1 - amino -2- anthraquinonyl-2',3'(S) -anthraquinone-thiazole corresponding to the formula
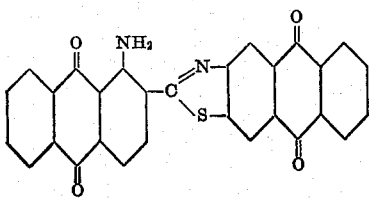
dissolving in concentrated sulphuric acid to give a yellow solution and dyeing cotton bluish red shades from a violet vat.
PAUL NAWIASKY.
BERTHOLD STEIN.
ERICH BERTHOLD.
ROBERT ZELL.